C. ADAMS-RANDALL.
ELASTIC WHEEL.
APPLICATION FILED SEPT. 7, 1906.
1,061,580.
Patented May 13, 1913.
2 SHEETS—SHEET 2.
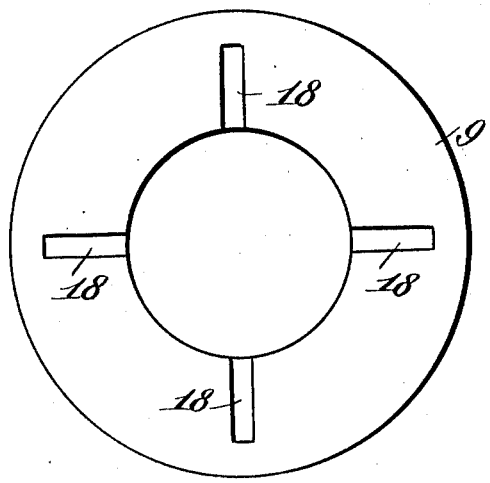
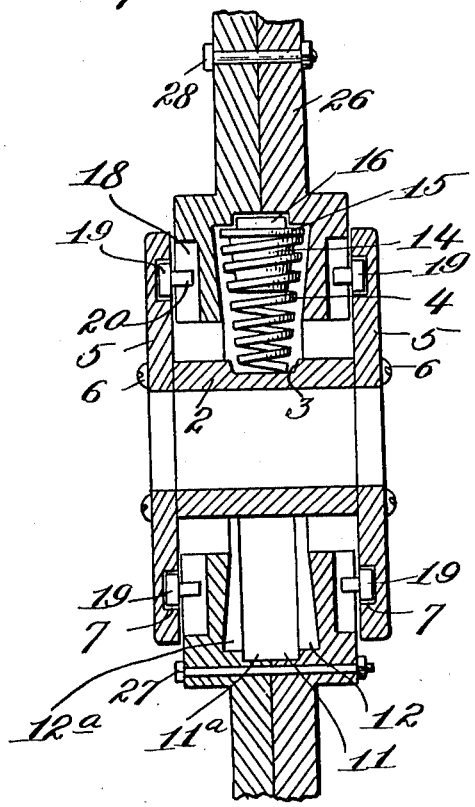
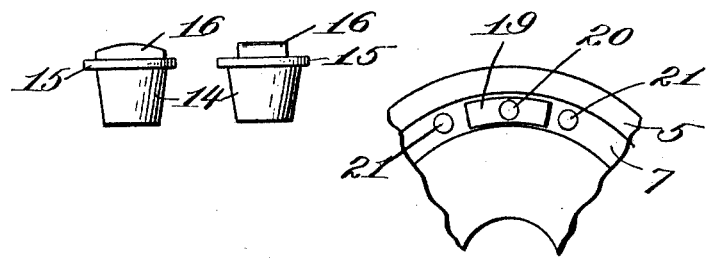
Witnesses:
C. W. Kesler
Inventor
Charles Adams-Randall
By
James L. Norris
Atty

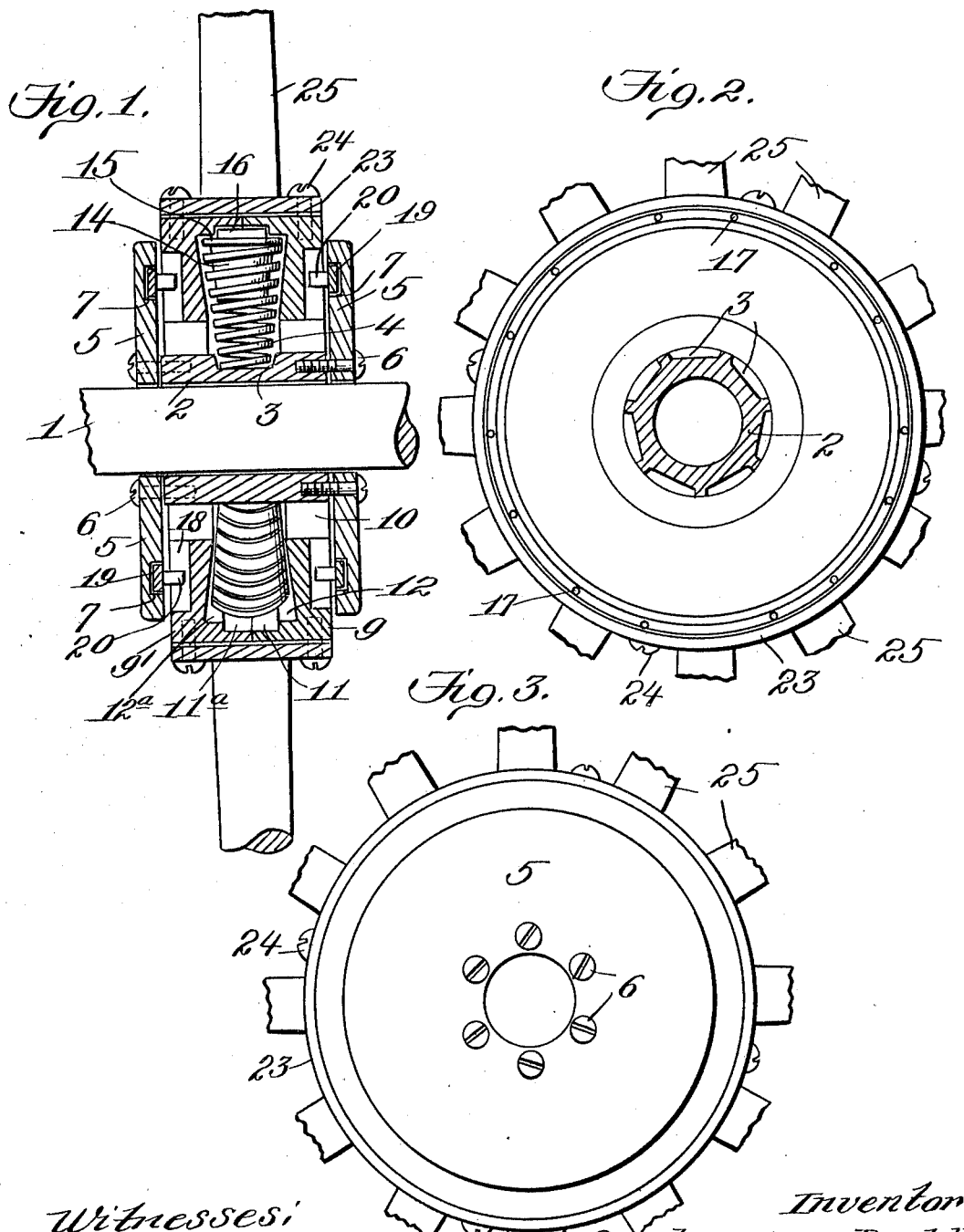

UNITED STATES PATENT OFFICE.

CHARLES ADAMS-RANDALL, OF NEW YORK, N. Y.

ELASTIC WHEEL.

1,061,580.  Specification of Letters Patent.  Patented May 13, 1913.

Application filed September 7, 1906. Serial No. 333,689.

*To all whom it may concern:*

Be it known that I, CHARLES ADAMS-RANDALL, a citizen of the United States, residing at New York, in the county of New York and State of New York, have invented new and useful Improvements in Elastic Wheels, of which the following is a specification.

This invention relates to improvements in resilient wheels, and consists generally in the new, novel and special construction of a wheel provided with resilient means disposed in such manner that excessive jarring and jolting are prevented and liability of damage to the machinery of automobiles or self propelled carriages on which it is intended to use the wheel is largely obviated and greater ease and comfort assured to the occupants of such vehicles.

The invention consists more particularly of a wheel constructed to have an independently movable hub constituting the inner portion of the wheel in which the resilient means are located, and an interchangeable independent outer portion constituting the spokes, rim and tire section or tread organization of the wheel arranged to be secured rigidly to the inner part of the latter.

In carrying out the invention, the hub is preferably made of two component parts, the inner part being fitted loosely upon the axle, and the outer part surrounding the inner part with sufficient space between the parts to inclose and contain the resilient means which serves to keep the two parts in normal position, said resilient means consisting of suitable spiral springs. Means are also provided for securing the two parts of the hub together by a loose mechanical joint or connection, which permits free movement of the two component parts, to and from each other, the degree of movement being determined by the tension of pressure put upon the resilient means by the action of the wheel in passing over the roadway. The loose mechanical connection also acts to join the parts in such manner that they revolve together axially, practically as one solid piece. The outer portion of tread organization of the wheel constituted by the spokes, rim and tire section, is independent of the hub and readily interchangeable, and may be made in any preferable manner and with any desired degree of strength or of any diameter.

In the drawings, Figure 1 is a transverse vertical section through a wheel embodying the features of the invention. Fig. 2 is a sectional elevation of one of the component parts of the inner portion of the wheel, looking toward the inner side thereof. Fig. 3 is an outer side elevation of the wheel as shown by Fig. 1. Fig. 4 is a detail elevation of the outer side of the wheel, a portion thereof being removed. Fig. 5 shows detail views of parts of the wheel. Fig. 6 is a view similar to Fig. 1, embodying a modification of the wheel.

Similar numerals of reference are employed to indicate corresponding parts in the several views.

The numeral 1, Fig. 1, represents the axle, on which is loosely fitted a metal hub 2, this hub being free to turn upon the axle, and being provided with annular seats 3, in each of which rests one end of a spiral spring 4. The hub 2 is provided with annular connecting members or flanges 5, one on each side, both connecting members being secured to the hub by screws or other analogous fastenings 6. These connecting members or flanges are provided with annular grooves 7 in their inner faces or sides. The remaining part of the hub consists of two rings or pieces 9 and 9', which surround the hub proper, a space 10 being provided between the outer surface of the hub 2, and the inner surface of the rings or pieces 9 and 9'. The rings or pieces 9 and 9' have the connecting members or flanges 5 extended thereover and loosely connected thereto in a manner which will be more fully hereinafter set forth, said connecting members obviating any lost motion or side play of the rings. The inner portions of the rings 9—9' are formed with annular grooves 11—11ᵃ and 12—12ᵃ, the annular grooves 12—12ᵃ providing recesses in which the spiral springs 4 are loosely contained and thus held in place by the said rings 9—9'. Each spring 4 is engaged by a pin or plug 14, which is of nearly the same diameter as the inside of the outer portion of the spring and serves to strengthen the latter and prevent buckling or bending of the same. The pin or plug 14 is provided with a cap 15, see Fig. 5, against which the outer end of the spring 4 abuts, and said cap has a metal shoe 16, which fits loosely within the annular grooves 11—11ᵃ and is permitted to move or slide with a rotary movement limited by pins 17, and thereafter revolves with or around the axle with the parts 9 and 5 or other metal devices may be fixed at certain distances apart within the grooves 11—11ª for a similar purpose. During the sliding movement of the shoe 16 and its pin or plug 14, the spring 4 in engagement with the latter moves in consonance therewith. In lieu of the grooves 11—11ª constituting an annular seat for the shoes of the caps on the pins or plugs, it is obvious that suitable recesses might be adopted, but it is preferred that the grooves be used, in view of the fact that the structure is thereby very much simplified and the assemblage of the coöperating parts is facilitated. It will also be understood that the springs 4 and the pins or plugs 14 will be of the same number as the seats 3 in the hub 2, and furthermore that such number may be varied at will, but in all constructions the springs will occupy radial positions with respect to the hub and have their enlarged extremities outermost. Furthermore, the size and strength of the springs will depend upon the proportions and general dimensions of the wheel, and also upon the work to be performed by the wheel.

The outer sides or faces of the rings 9—9' are formed with a plurality of diametrically or radially disposed recesses 18, see Fig. 4. In the annular grooves 7 of the connecting members or flanges 5, metal shoes 19 are disposed and have round projecting pins 20, the number of shoes and pins being the same as the number of grooves 18. Each pin 20 fits loosely in one of the grooves or recesses 18, and is movable longitudinally with relation to the groove or recess and radially with respect to the wheel structure, and at the same time rotary movement is given to the shoe 19 in the groove 7. The movement of each shoe 19 is limited by pins or pieces 21 fixed within the groove at certain distances apart, or in some instances the groove 7 may be replaced by seats of limited extent, against the end walls of which the opposite terminals of the shoe may abut.

Each shoe 19 is disposed within the groove 7 of one of the connecting members 5, and the pin 20 fitted in one of the recesses 18 and the connecting member is then secured to the hub 2, the same operation being pursued in connection with all of the shoes and in both connecting members. When thus completed, the wheel has added thereto an annular base or surrounding ring 23, which is fitted over and upon the rings 9—9' and secured by screws 24 engaging the two rings, or in any other preferred manner, this base element serving to hold the two rings in close operative relation.

It will be observed that the provision of the rings 9—9' is very convenient in assembling the springs 4 therewith, and also disposing the pins or plugs 14 in proper position with relation to said springs, and at any time that may be necessary the rings 9—9' may be separated and a broken or otherwise injured spring may be removed and replaced by another of similar structure.

The use of metal spring means as set forth is an advantage over pneumatic means, in that it is a more reliable method of obtaining a positive resiliency and more mechanically perfect, durable and cheaper, and reduces the wear and tear of traction to a minimum, as well as permitting the use of any traction tire in connection with spokes 25 which project outwardly from the base 23. Furthermore, the improved wheel overcomes the necessity of using special tires to prevent "skidding," and also the trouble and loss of resiliency due to leakage and the consequent inconvenience of re-inflation and other accidents resulting from bursting, puncturing or violent removal of the pneumatic tires from the outer rims of wheels. The improved wheel also averts serious accidents and other trouble experienced by the users of pneumatic tires, especially on the wheels of automobiles.

As a simple modification of the wheel structure just described, the rings 9—9' may have spoke members 6 integrally formed therewith and projected outwardly therefrom, as shown by Fig. 6, the spoke members being in halves and the rings 9—9' connected by transverse bolts 27 extending therethrough. The spoke members 26 will also have transverse connecting bolts 28 engaging the same at regular intervals.

From the foregoing it will be understood that the hub 2 is composed of inner and outer portions independent of each other and separated by an intervening space and conjointly operating as explained. In the modification as shown by Fig. 6 the hub is likewise composed of inner and outer portions and the spoke members are continued outwardly from the outer part of the hub to any desired length and to the outer ends of which the rim and tire or tread portion of the wheel is secured, thus forming the outer hub portion and the spoke and rim portion practically continuous or as a combined organization, the spoke sections 26 and the rim, tire or tread portion being constructed in two halves and with the outer hub portion surrounding the inner hub portion with resilient springs between the two hub portions in the same manner as hereinbefore explained. The remaining features of construction of the wheel included in this modified organization are similar to those heretofore described, the outer or tread portion or organization including the outer hub portion being joined to the inner hub portion 2 by loose-joint mechanical means as heretofore described in connection with the construction shown by Figs. 1, 2, 3, 4 and 5, and operating to cause the inner hub portion 2 and the outer hub portion and tread organization to unitedly revolve while permitting an independent movement of the said hub portion 2 and the axle therethrough or inserted therein toward and from the outer hub portion and tread organization.

Having thus described the invention, what is claimed, is:

1. In a resilient wheel, the combination of a hub comprising a tubular member, annular side flanges secured to the tubular member and formed with annular grooves in their inner faces and a ring movably held between the annular side flanges and separated from the said tubular member, the outer sides or faces of the ring being formed with a plurality of radially disposed recesses, shoes movably mounted in the annular grooves of the side flanges and having projections extending into the radially disposed recesses of the ring, the inner periphery of the ring being formed with grooves, and radially disposed springs interposed between the tubular member of the hub and the grooves in the inner periphery of the ring, the outer extremities of the springs being circumferentially movable.

2. In a resilient wheel, the combination of a hub comprising a tubular member and a ring surrounding the said member and radially movable with relation to the latter, the ring having grooves in its inner periphery and also radial grooves in its outer sides, annular side flanges secured to the tubular member and having annular grooves in its inner faces, shoes movably mounted in the annular grooves of the flanges and having projections extending into the radial grooves of the ring, shoes also disposed in a part of the grooves in the inner periphery of the ring and circumferentially movable in said grooves, and radially disposed springs between the tubular member and the ring and having portions thereof fitted over the shoes in part of the grooves in the inner periphery of the ring and circumferentially movable with said latter shoes.

In testimony whereof I have hereunto set my hand in presence of two subscribing witnesses.

CHARLES ADAMS-RANDALL.

Witnesses:
A. C. HETHERLIN,
H. C. RIDGELY.

Copies of this patent may be obtained for five cents each, by addressing the "Commissioner of Patents, Washington, D. C."